United States Patent [19]

Terasaki et al.

[11] Patent Number: 5,289,660
[45] Date of Patent: Mar. 1, 1994

[54] METHOD AND APPARATUS FOR GRINDING NON-CIRCULAR WORKPIECE

[75] Inventors: Fumitoshi Terasaki; Tatsuhiro Yoshimura, both of Niwa, Japan

[73] Assignee: Okuma Corporation, Nagoya, Japan

[21] Appl. No.: 52,183

[22] Filed: Apr. 22, 1993

[30] Foreign Application Priority Data

Apr. 25, 1992 [JP] Japan .................... 4-131532

[51] Int. Cl.$^5$ ................. B24B 19/12; B24B 51/00
[52] U.S. Cl. ............... 51/165.71; 51/289 R; 51/281 C; 51/97 NC
[58] Field of Search ........... 51/165.71, 165.75, 165 R, 51/289 R, 97 NC, 281 C, 327, 105 EC, 105 SP

[56] References Cited

U.S. PATENT DOCUMENTS

| 4,262,454 | 4/1981 | Iida et al. | 51/97 NC |
| 4,400,781 | 8/1983 | Hotta et al. | 51/97 NC |
| 4,873,793 | 10/1989 | Asano et al. | 51/165.71 |
| 4,963,805 | 10/1990 | Suzuki et al. | 51/165.71 |

FOREIGN PATENT DOCUMENTS

| 0334345 | 9/1989 | European Pat. Off. | 51/289 R |
| 53-148782 | 12/1978 | Japan . | |
| 0114660 | 9/1981 | Japan | 51/97 NC |
| 57-49349 | 10/1982 | Japan . | |
| 0124561 | 7/1984 | Japan | 51/97 NC |

Primary Examiner—Robert A. Rose
Attorney, Agent, or Firm—Spensley Horn Jubas & Lubitz

[57] ABSTRACT

When a non-circular workpiece is to be machined by an NC cylindrical grinding machine, the latter is controlled such that the velocity of each of the main spindle and grinding head does not exceed a threshold allowable by the machine. A non-circle data pre-processing section is provided to convert a group of angle and lift points relating to the shape data into profile data to determine the complete circumferential length of the profile. The circumferential length of the profile is divided into line segments of minute and equal length at a plurality of division points. When the tool is brought into contact with the workpiece at each of the division points, a reference X/C axes data relating to the X-axis position of the tool and the rotational angle of the main spindle at this time is prepared. The reference X/C axes data are selected out to prepare temporary X/C axes data which in turn are used to determine the velocity, acceleration and rate of acceleration change in each of the main spindle and tool head. These determined values are compared with the respective thresholds. If they exceed the respective thresholds, the rate of selecting is changed. If the calculated values do not exceed the respective thresholds, the temporary X/C axes data is taken as modified X/C axes data. The machining will be carried out in accordance with the modified X/C axes data.

2 Claims, 7 Drawing Sheets

METHOD AND APPARATUS FOR GRINDING NON-CIRCULAR WORKPIECE

BACKGROUND OF THE INVENTION

1. Field of the Invention

The present invention relates to working method and apparatus of grinding a workpiece and particularly a non-circular workpiece such as a cam or the like, the workpiece being fixedly mounted on a workpiece head and ground by a cutting tool which engages the outer periphery of the workpiece while being rotated with the main spindle or shaft.

2. Description of the Related Art

An NC cylindrical grinding machine which is adapted to work non-circular workpieces by a combination of the rotation of a main spindle with the reciprocation of a grinding head having a grinding wheel requires data relating to the movement of the grinding head relative to the rotational angle of the main spindle. Such data will be referred to "X/C axes data". The X/C axes data is calculated from the shape data representing the non-circular configuration of the workpiece, the diameter of the grinding wheel and the revolution speed of the workpiece. The right half A of FIG. 1 shows a method of grinding a workpiece 12 while it is being rotated at a constant velocity, in accordance with the X/C axes data so calculated. The left half B of FIG. 1 shows another method of grinding a workpiece while changing the rotational velocity of the main spindle to make the circumferential velocity of the workpiece constant, in accordance with the X/C axes data. When the rotational velocity of the workpiece is constant (A), the rotational angle $\theta_1$ of the rotating workpiece per given time period is also constant. On the other hand, when the circumferential velocity of the workpiece is constant (B), the distant of movement $r_1$ of a contact point between the tool and the workpiece per given time period is constant.

FIG. 2 is a block diagram illustrating the electrical arrangement usable in the method of grinding the workpiece while the rotation of the main spindle is maintained constant. The arrangement comprises a servo system section 70 for controlling various shafts, a RAM 72 for storing a working program and variables relating to the controlled shafts, and a ROM 73 for storing software relating to the control of the shafts, the software being read upon power ON of the system. Various data are processed by a main processor 71. When a servo processor 74 receives commands of shaft movement from the main processor 71, the servo processor 74 mainly controls the acceleration and deceleration of the shafts and gives the commands of shaft movement to drive units 75. Each of the drive units 75 supplies an electric drive power to the servo motor of the corresponding shaft.

In order to calculate the X/C axes data from the data of non-circular configuration provided by a non-circle data pre-processing section 30 considering the diameter of the grinding wheel as well as the time required for the work to complete one revolution, a RAM 37 is provided which comprises a shape data storage section 31, a grinder diameter storage section 32, a main spindle revolution storage section 33 and an X/C axes data storage section 38. A processor 54 is also provided which comprises a cam profile calculating section 50 for converting a group of given angle and lift points into profile data, and an X/C axes data calculating section 55 for calculating the position of the grinding head and the angle of the main shaft.

FIG. 3 is a block diagram showing another electric arrangement for changing the rotational velocity of the main spindle to make the circumferential velocity of the workpiece constant. Such an arrangement is only different from the arrangement of FIG. 2 in that the processor 54 shown in FIG. 3 comprises a circumferential cam length calculating section 51 for calculating the circumferential length of the cam, and a profile dividing point calculating section 52 for dividing the determined profile into segments having equal length.

Since the revolution speed of the main spindle is constant when the rotational velocity of the workpiece is constant as described, there will not be any delay of control on changing the rotational velocity of the workpiece. Thus, such a method can completely prevent any error from be produced due to variations of the revolution speed of the main spindle. However, the velocity of movement of the contact point between the workpiece and the cutting tool becomes uneven, resulting in irregular grinding. This further results in an uneven reaction against the cutting tool. As shown by C in FIG. 1, for example, a transitional portion from the base circle to the raised part will have a rapid increase in the movement of contact point. Thus, the cutting resistance and associated reactive force on the tool are increased with an adverse affect on the life of the tool. Further, the grinding time is also insufficient to obtain the desired grinding, resulting in production of non-worked parts. When the cutting resistance increases, the workpiece itself becomes deformed which prevents contact between the workpiece and the cutting tool. This produces non-ground parts of the workpiece, leading to errors in working.

On the other hand, since the grinding is constantly carried out when the circumferential velocity of the workpiece is constant, the cutting resistance may be maintained constant. Thus, the above problems relating to the life of the tool and the non-worked parts can be overcome. However, this creates some delay on controlling the revolution speed of the main spindle to increase changes in velocity and acceleration. This may generate a chatter mark on the ground surface of the workpiece. The chatter mark is a wavy pattern resulting in degradation of the quality of product.

In both the related art methods described, the non-circular configuration is approximated to a group of line segments having minute lengths. In other words, the end points (division points) of each of the line segments are determined to specify the configuration of a workpiece. However, since the configuration of the workpiece is inherently curved, the number of division points becomes huge making the working control and calculation more complicated.

SUMMARY OF THE INVENTION

It is therefore an object of the present invention to provide a method and apparatus for grinding a non-circular workpiece at a constant velocity within a limitation in which the tool head and main spindle can follow such a predetermined velocity, by controlling the velocity, acceleration and rate of acceleration change through time in the tool head and main spindle, which are moving, to be levels equal to or lower than a predetermined level.

To this end, the present invention first determines the circumferential length of a workpiece from its configuration represented by a group of polar coordinate points which are obtained from a distance between the origin which is the center of the base circle and each point on the circumference of the workpiece and also from an angle included between that point and the reference radial line. The circumferential length is then divided into minute segments of equal length. The length of the minute segments is determined to approximate sufficiently to the curved parts of the workpiece. For each of the division points in the circumference of the workpiece, reference X/C axes data is prepared which relates to the position of the tool head when the workpiece is brought into contact with the cutting tool (X-axis position) and the rotational angle of the main spindle (C-axis position). The division points in the X/C axes data are selected at a given rate. The selected data is used to prepare temporary X/C axes data which in turn is used to grind a test workpiece. At this time, the actions of the tool head and main spindle are checked to see whether or not these actions are reasonably made. More particularly, it is checked whether or not the velocities and/or accelerations of the tool head and other movable parts exceed acceptable levels in the system and whether or not such values adversely affect the working precision and quality. If the desired conditions are not satisfied in this checking step, the rate of data selection is varied only with respect to the selected X/C axes data. Thus, an unreasonable control resulting from the approximation of the minute line segments to the curved segments can be avoided, with the total number of division points being reduced by the data selection step. If the aforementioned temporary X/C axes data meets the desired conditions, the temporary X/C axes data is then used as modified X/C axes data which in turn is used to control the rotation of the main spindle and the reciprocation of the tool head.

In order to perform the aforementioned method of the present invention, an apparatus for grinding a non-circular workpiece first comprises a shape data storage section for storing the shape of a workpiece represented by a mass of polar coordinate points and a tool shape storage section for storing data on factors such as the shape and diameter of the tool. The apparatus also comprises a spindle revolution storage section for storing time required to rotate the workpiece through one complete revolution, relating to the velocity of run in the apparatus and others.

The apparatus further comprises a workpiece shape calculating means for converting data stored in the shape data storage section into profile data which represents the profile of the workpiece, a circumferential length calculating means for calculating the circumferential length of the workpiece from the profile data, a division point calculating means for calculating division points dividing the circumferential length of the workpiece into line segments of minute length, and reference X/C axes data calculating means for calculating reference X/C axes data representing the relationship between the position of a tool head and the rotational angle of a main spindle when the tool engages each of the division points. The apparatus further comprises a temporary X/C axes data preparing section for selecting the division points in the reference X/C axes data with a given rate and for preparing a temporary X/C axes data, and a data modifying means for judging whether or not the velocities and accelerations of the main spindle and tool head and the rate of change in the accelerations through time meet the running and working conditions required by the machine when the working is carried out in accordance with the temporary X/C axes data and for modifying the rate of selection to change the temporary X/C axes data if the working conditions are not satisfied. The apparatus still further comprises a modified X/C axes data determining section for taking the temporary X/C axes data as modified X/C axes data if the temporary X/C axes data meets the working and running conditions throughout the circumference of the workpiece. The work is then performed in accordance with the modified X/C axes data.

As will be apparent from the above description, the modified X/C axes data can be used to control the tool head and main spindle at such a velocity and acceleration that can be realized by the apparatus and will not adversely affect the precision and finishing of the workpiece. Since the reference X/C axes data used to prepare the modified X/C axes data is defined by the division points dividing the circumference of the work into line segments of equal length, the working process can be controlled to be performed at a constant grinding velocity. Thus, the working process can stably be carried out at a constant grinding velocity by the use of the modified X/C axes data.

Since the cutting velocity is constant, the cutting resistance can be substantially Constant. This ensures that the workpiece is ground with less error and without leaving any non-worked parts. Furthermore, the useful life of the tool can be elongated since the force applied to the tool is not greatly variable.

The shape data representing the shape of the non-circular workpiece is normally provided from a distance between the rotational center of the workpiece and each point on the outer periphery of the workpiece and data obtained by determining the angles of line segments representing the distances through the entire circumference of the workpiece. A group of division points dividing the profile of the workpiece obtained by smoothly combining the shape data into line segments of minute and equal length are determined with respect to their positions. The reference X/C axes data is determined from data relating to the angle of the main spindle and the position of the grinding head when the grinding wheel is bought into contact with each of the division points. The reference X/C axes data is prepared such that the machine can operate at sufficiently low velocity, acceleration and rate of acceleration change within a limited range of operation followed by the machine and that the grinding velocity on the circumference of the workpiece becomes constant.

Next, new X/C axes data is prepared by jumping the reference X/C axes data every so many steps. The velocity is determined from the position data determined at one step before and a position data to be now determined. The acceleration is determined from the position data determined at two steps before, the position data determined at one step before and a position data to be now determined. The change of acceleration is further determined from the position data determined at three steps before, the position data determined at two steps before, the position data determined at one step before and a position data to be now determined. If any one of the velocity, acceleration and rate of acceleration change thus obtained exceeds a threshold value, the number of steps to be jumped to determine the position is reduced and the reference X/C axes data is re-calculated. Modified X/C axes data is prepared by repeating such a procedure and is then used to grind a non-circular workpiece.

DETAILED DESCRIPTION OF THE PREFERRED EMBODIMENTS

Figure 1:
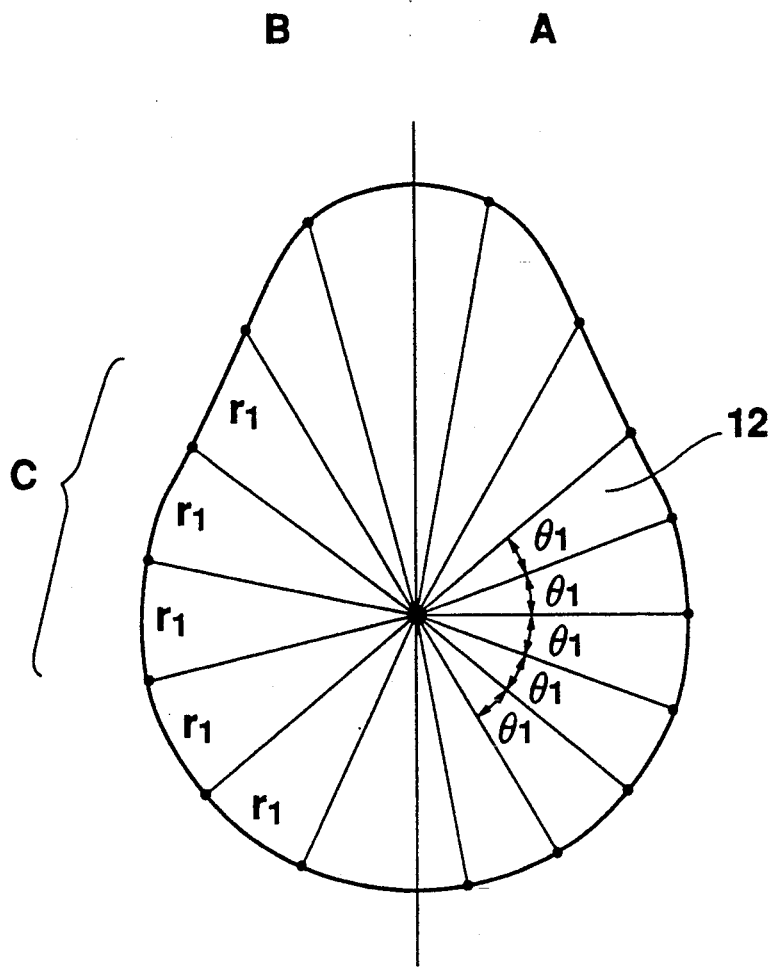
FIG. 1 shows a non-circular workpiece grinding method of the related art, with the right half thereof being when the rotation of the main spindle is constant and with the left half thereof being when the peripheral velocity on the circumference of the workpiece being ground is constant.
Figure 2:
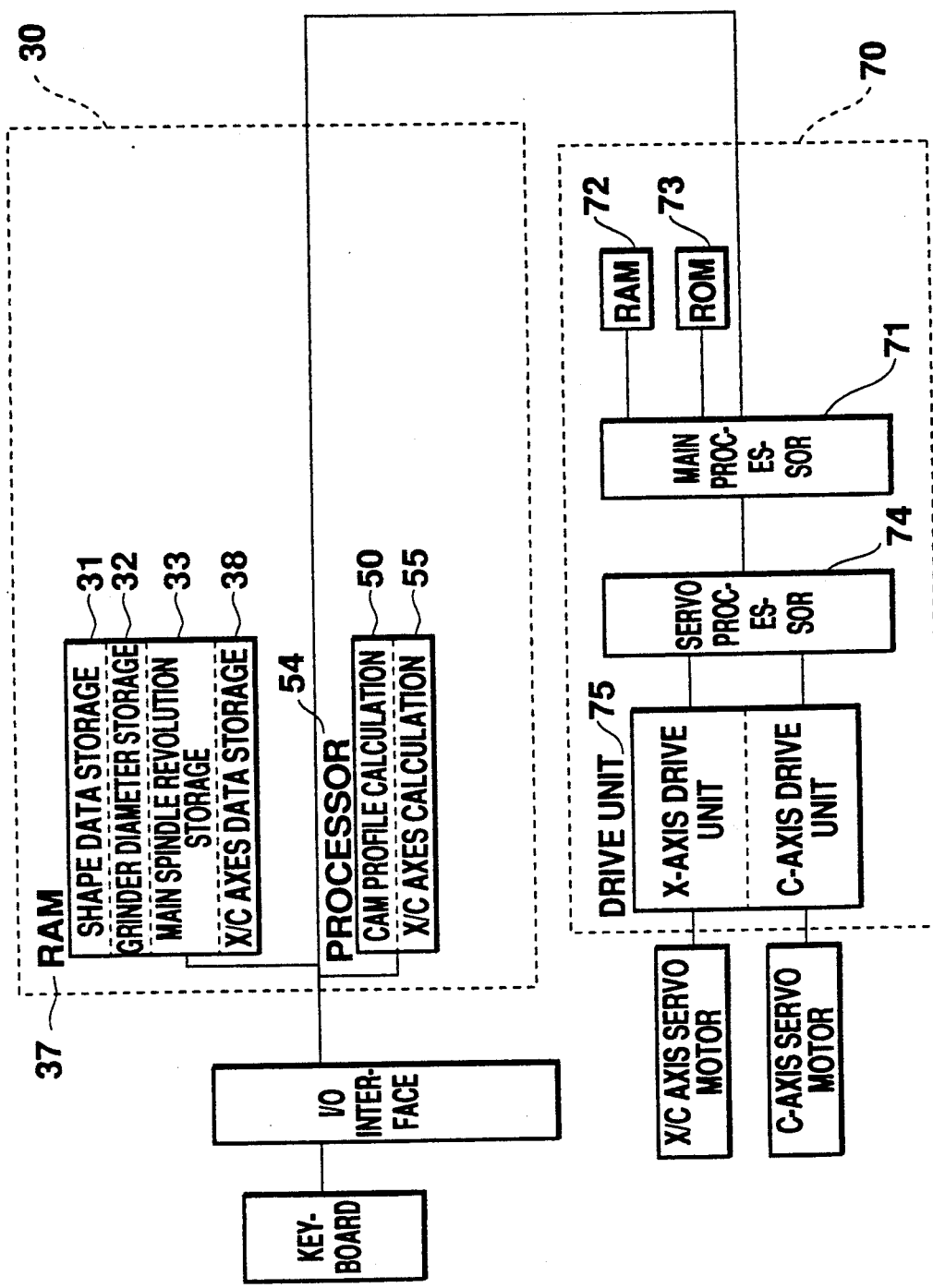
FIG. 2 is a block diagram of an electrical arrangement in an NC cylindrical grinding machine usable when a non-circular workpiece is ground at an invariable rotational velocity of the main spindle.
Figure 3:
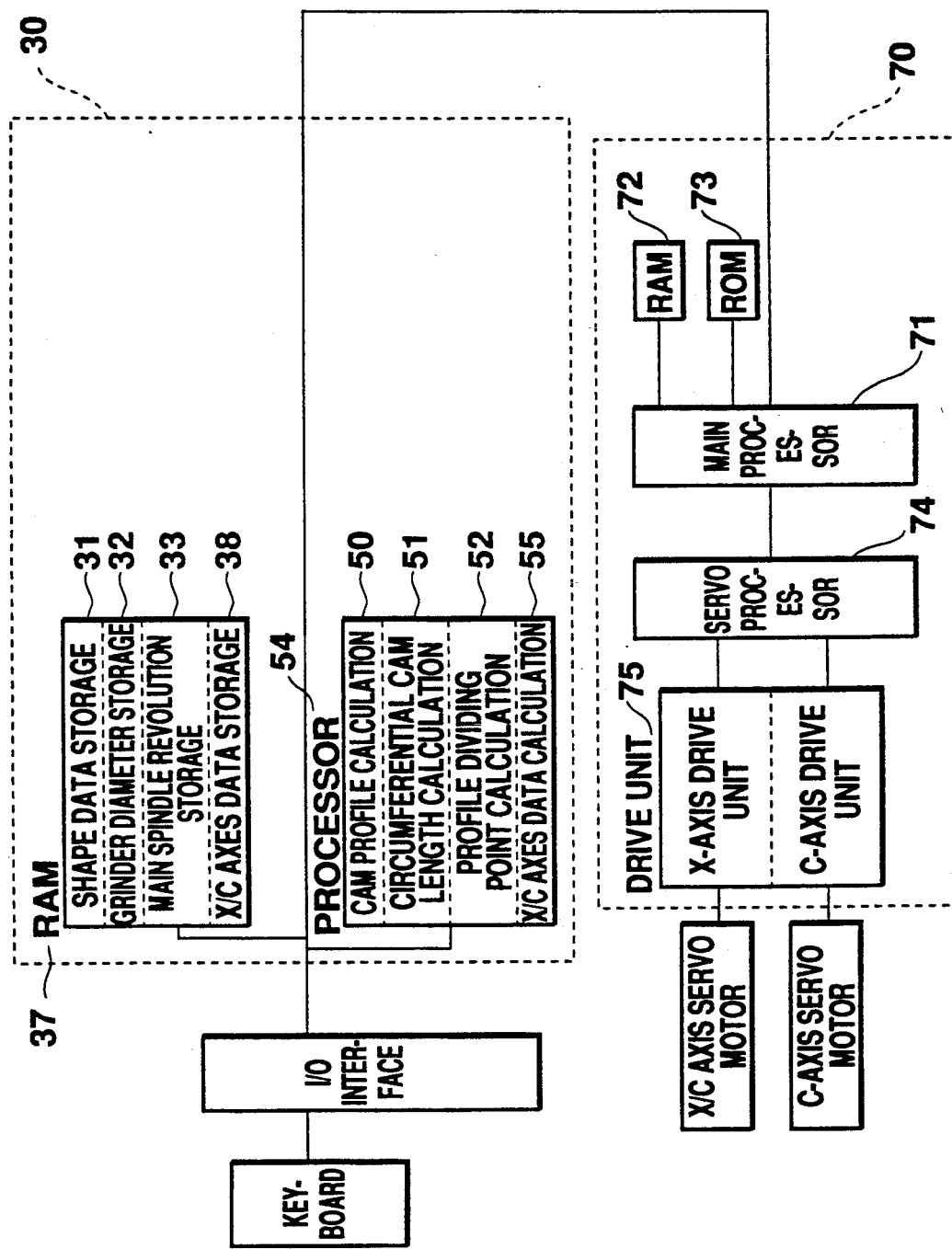
FIG. 3 is a block diagram of another electrical arrangement in the NC cylindrical grinding machine usable when a non-circular workpiece is ground at an invariable velocity on the circumference thereof.
Figure 4:
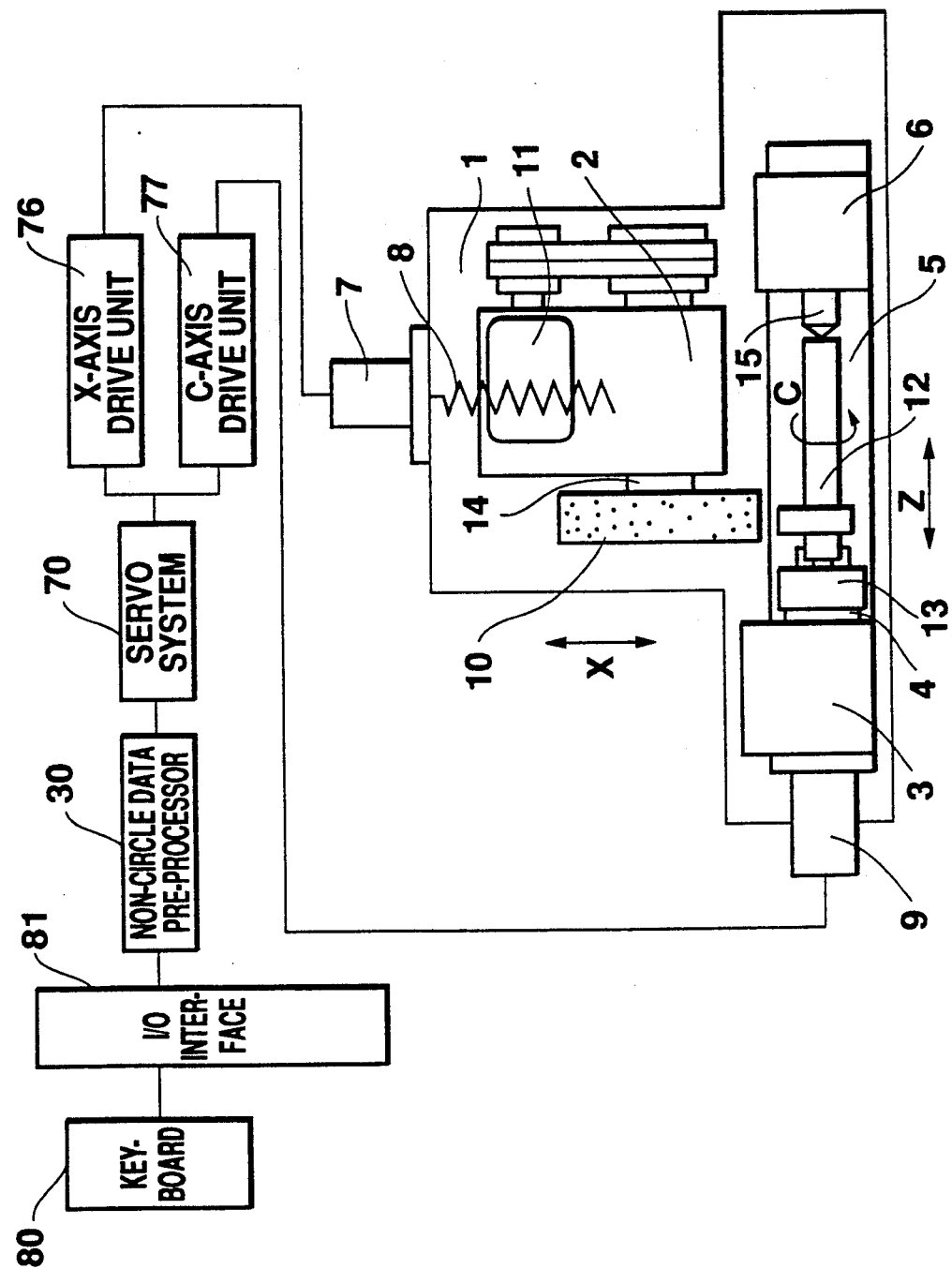
FIG. 4 is a view showing an NC cylindrical grinding machine, including a block diagram illustrating the electrical arrangement thereof.

Referring now to FIGS. 4-8 and particularly to FIG. 4, there is shown an NC cylindrical grinding machine which comprises a bed 1 and a grinding head 2 mounted toward the rear of the bed 1 for movement in X-axis direction. The grinding head 2 is moved and positioned by a ball screw 8 which is driven by an X-axis servo motor 7 fixedly mounted on the bed 1. The grinding head 2 rotatably supports a grinding shaft 14 on which a grinding wheel 10 is fixedly mounted. The grinding wheel 10 is rotated and moved by a motor 11 which is fixedly mounted on the grinding head 2. The front region of the bed 1 has a slide face which extends in the Z-axis direction and slidably supports a table 5. The table 5 supports a main spindle head 3 and a tail stock 6 for mounting thereon at different positions. The main spindle head 3 rotatably supports a main spindle 4 which is rotatably driven by a C-axis servo motor 9 fixedly mounted on the main spindle head 3. The forward end of the main spindle 4 includes a chuck 13. The tail stock 6 supports a tail stock spindle for movement in the axial direction. The tail stock spindle detachably supports a center 15 which can hold a workpiece 12 with the chuck 13.

Figure 5:
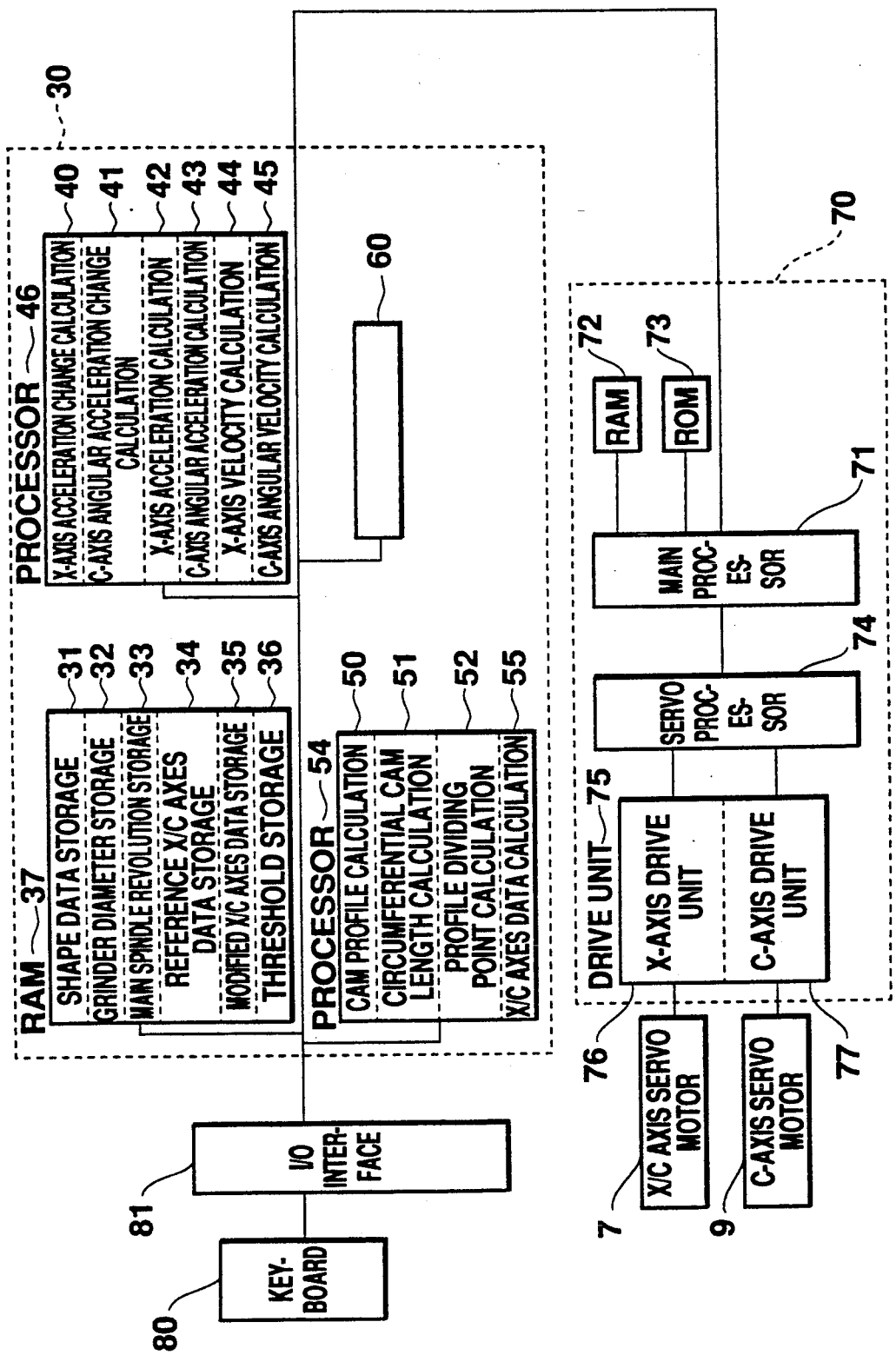
FIG. 5 is a block diagram showing the details of the electrical arrangement shown in FIG. 4.

The block diagram section of FIG. 4 shows the basic parts of an electrical arrangement usable in the NC cylindrical grinding machine, the details thereof being also shown in FIG. 5. The electrical arrangement comprises a servo system section 70 for controlling the shaft and spindle, a RAM 72 in which a working program and variables relating to the controlled shafts and spindles have been previously stored, and a ROM 73 for storing software relating to the control of the shaft and spindle, the software being read into the system on power ON. Various data are processed by a main processor 71. A servo processor 74 mainly receives commands relating to the movement of the shaft and spindle from the main processor 71 to control the acceleration and deceleration of the shaft and spindle and provides commands relating to the movement of the shaft and spindle to a drive unit 75. The drive unit 75 includes an X-axis drive unit 76 and a C-axis drive unit 77 which are powered to drive servo motors 7 and 9 for the respective shaft and spindle. These components 70-77 are not different from those of the related art.

A non-circle data processing section 30 calculates reference X/C axes data from a given non-circle data and further calculates modified X/C axes data by selecting the reference X/C axes data at a rate of selection to relieve the load in processing so that the velocity, acceleration and rate of acceleration change in each of the main spindle 4 and grinding head 2 is within a threshold followable by the machine. The selecting rate can be set in such a manner as will be described later. The non-circle data processing section 30 comprises a RAM 37 which includes a shape data storage section 31 for storing the shape data representing a non-circular configuration, a grinding wheel diameter storage section 32 for storing the diameter of the grinding wheel 10 and a main spindle revolution storage section 33 for storing the time required to rotate the workpiece 12 through one complete revolution when the workpiece is being ground. The components 31-33 are not different from those of the related art. The non-circle data processing section 30 further comprises a reference X/C axes data storage section 34 for storing reference X/C axes data representing the position of the grinding head 2 and the angle of the main spindle 4 when the grinding wheel is bought into contact with the workpiece at each of division points which divide the profile of the workpiece obtained from the shape data into line segments of minute and equal length, a modified X/C axes data storage section 35 for storing X/C axes data so modified that the velocity, acceleration and rate of acceleration change in each of the main spindle 4 and grinding head 2 are within a threshold which has been previously set, and a threshold storage section 36 for storing threshold values relating to the velocity, acceleration and rate of acceleration change in each of the main spindle 4 and grinding head 2.

A processor 54 comprises a cam profile calculating section 50 for converting a given group of angle and lift points into profile data, a circumferential cam length calculating section 51 for calculating the circumferential length of the workpiece or cam, a profile division point calculating section 52 for dividing the determined profile into line segments of minute and equal length, and a reference X/C axes data calculating section 53 for calculating the position of the grinding head 2 and the angle of the main spindle 4 when the grinding wheel 10 is brought into contact with the workpiece at each of the division points.

A processor 46 is provided to skip read the reference X/C axes data by jumping some division points and to calculate the velocity, acceleration and rate of acceleration change in the respective one of the shaft and spindle. The processor 46 comprises an X-axis acceleration change calculating section 40, a C-axis angular acceleration change calculating section 41, an X-axis acceleration calculating section 42, a C-axis angular velocity calculating section 43, an X-axis velocity calculating section 44 and a C-axis angular velocity calculating section 45. An X/C axes data modifying section 60 is provided to reduce the number of division points to be skipped so that the calculated velocity, acceleration and rate of acceleration change can be placed within the respective thresholds if they exceed these thresholds.

Data inputted from a keyboard 80 is transmitted to the non-circle data pre-processing section 30 and servo system section 70 through an I/O interface 81.

Figure 6:
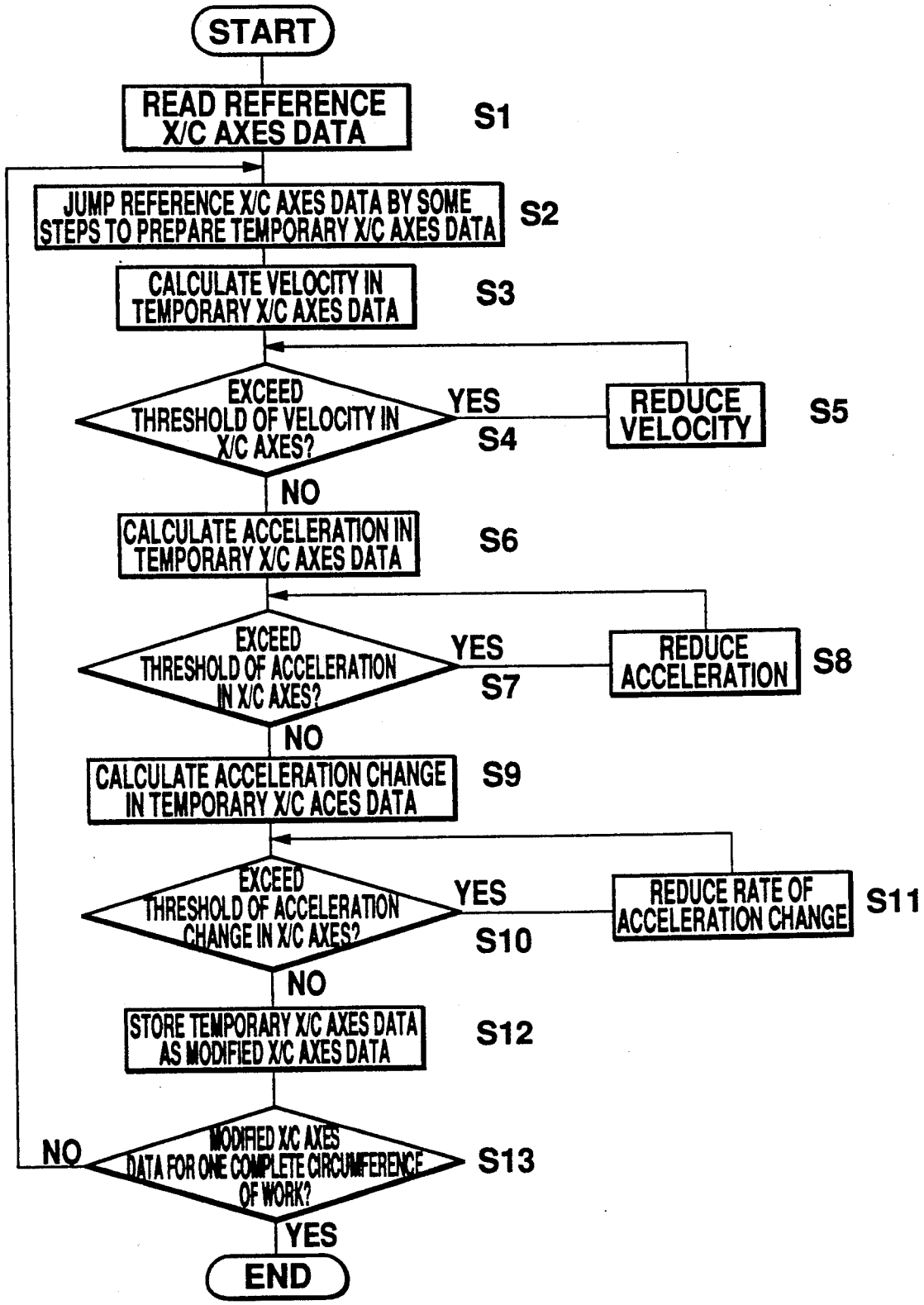
FIG. 6 is a flowchart illustrating the operation of the present invention.

The operation of the illustrated embodiment will now be described with reference to a flowchart shown in FIG. 6.

As a step S1, a reference X/C axes data is read in the system. The reference X/C axes data is prepared by the following procedure. First of all, a shape data representing the inputted non-circular configuration is called out of the shape data storage section 31 and the group of angle and lift points are then converted into profile data at the cam profile calculating section 50. The circumferential cam length calculating section calculates the circumferential length of the non-circular workpiece profile from the profile data. The profile division point calculating section 52 determines division points dividing the circumference of the profile into line segments of minute and equal length. From these points and the diameter of the grinding wheel 10 stored in the grinding wheel diameter storage section, the calculating section 53 calculates the reference X/C axes data representing the position of the grinding head 2 and the angle of the main spindle 4 when the workpiece 12 is brought into contact with the grinding wheel 10 at each of the division points. The calculated reference X/C axes data are stored in the reference X/C axes data storage section 34. The reference X/C axes data are prepared such that the machine can operate at the velocity, acceleration and rate of acceleration change sufficiently lower than threshold levels followable by the machine to provide a constant grinding velocity on the circumference of the workpiece.

Next, at a step S2, temporary X/C axes data is prepared by selecting the division points in the reference X/C axes data. In order to reproduce the non-circular configuration of the cam or the like as faithfully as possible, the reference X/C axes data is approximated to the profile data of the cam by the line segments of minute and equal length, as described. Thus, there may be more minute line segments than necessary at a certain place. In other words, the number of division points can be reduced without a great affection to the configuration of the workpiece actually ground by the machine. At the step S2, the temporary X/C axes data is prepared by selecting the division points in the reference X/C axes data at a constant rate. The subsequent steps check whether or not the workpiece can be ground in accordance with the temporary X/C axes data without any trouble.

At a step S3, the X-axis velocity in the temporary X/C axes data is calculated by the X-axis velocity calculating section 44 while the C-axis angular velocity in the temporary X/C axes data is calculated by the C-axis angular velocity calculating section 45. At a step S4, it is confirmed whether or not the velocity and angular velocity on the X- and C-axes exceed the respective thresholds which have been stored in the threshold storage section 36. If YES is confirmed, the reduction of velocity is performed at a step S5, as will be described.

If both the velocity and angular velocity do not exceed the thresholds, at a step S6, the X-axis acceleration in the temporary X/C axes data is calculated by the X-axis acceleration calculating section 42 while the C-axis angular acceleration in the temporary X/C axes data is calculated by the C-axis angular acceleration calculating section 43. At a step S7, subsequently, it is confirmed whether or not the calculated accelerations exceed the thresholds of acceleration in the X- and C-axes. If YES, at a step S8, the reduction of acceleration is performed. If NO, at a step S9, the rate of X-axis acceleration change in the temporary X/C axes data is calculated by the X-axis acceleration change calculating section 40 while the rate of C-axis angular acceleration change is calculated by the C-axis angular acceleration change calculating section 41. At a step S10, it is subsequently confirmed whether or not the calculated rates of acceleration and angular acceleration changes exceed the thresholds of acceleration change in the X- and C-axes. If YES, the reduction of acceleration change is carried out at a step S11. If NO, the temporary X/C axes data is stored in the modified X/C axes data storage section 35 as modified X/C axes data, at a step S12. At a step S13, it is subsequently confirmed whether or not the modified X/C axes data is prepared for the complete circumference of the workpiece. If NO, the program returns back to the step S2. If YES, the program is terminated.

The reduction of velocity, acceleration and rate of acceleration change will be described with reference to FIGS. 7 and 8.

Figure 7:
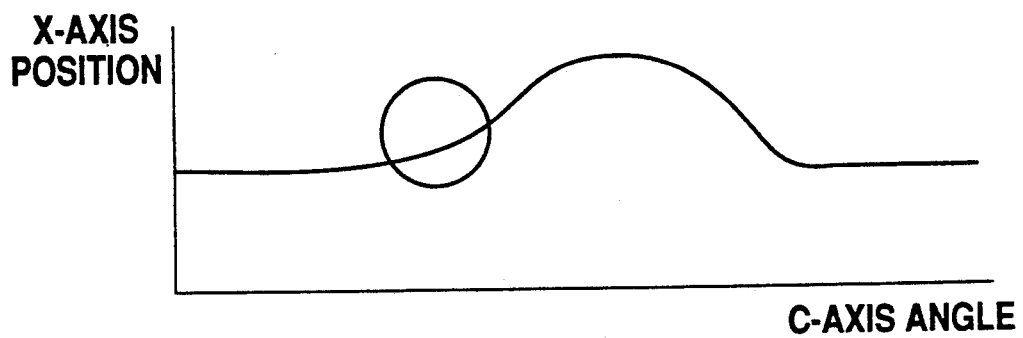
FIG. 7 is a graph illustrating the relationship between the rotational angle of the main spindle and the reciprocation of the grinding head.
Figure 8:
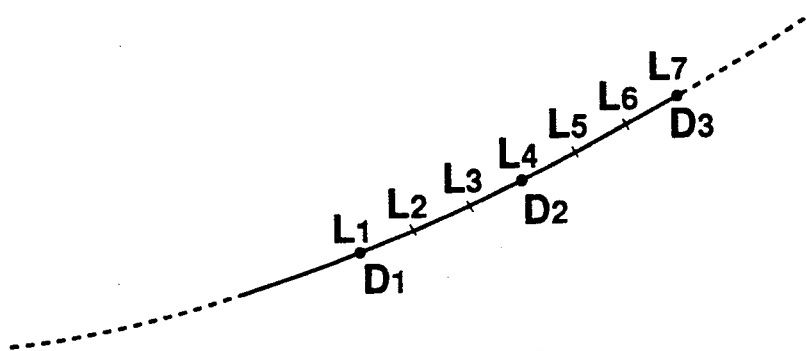
FIG. 8 is an enlarged view of the circled part of FIG. 7.

FIG. 7 shows a curve representing a series of reference X/C axes data $L_1$, $L_2$ ... $L_7$ while FIG. 8 shows an enlarged view of the circled part in FIG. 7. In FIG. 8, $D_1$, $D_2$ and $D_3$ are temporary X/C axes data which are prepared by selecting the reference X/C axes data every three division points. More particularly, the first reference X/C axes data $L_1$ is taken as the first temporary data $D_1$ while the other reference X/C axes data $L_2$ and $L_3$ are taken out. Next, the fourth reference X/C axes data $L_4$ is taken as the second temporary data $D_2$. In such a manner, one temporary division point will be selected every three reference division points in the reference X/C axes data. The selection of temporary division point is carried out while confirming that any one of the velocity, acceleration and rate of acceleration change of the machine system on selection do not exceed a predetermined level. It is now assumed that after the temporary X/C axes data $D_2$ has been prepared, the next reference X/C axes data $D_3$ is to be determined. When the division point $L_7$ is selected as the reference X/C axes data $D_3$ and if any one of the velocity, acceleration and rate of acceleration change on the selection exceeds a threshold, the division point $L_7$ must not be selected. Thus, the division point $L_6$ is selected in place of the division point $L_7$ and it is again confirmed whether or not any one of the velocity, acceleration and rate of acceleration change on this selection exceeds the threshold. If the condition is not satisfied, the division point $L_5$ is further selected in place of the division points $L_6$. If the division point $L_5$ does not also meet the required condition, the selection program returns back to the temporary division point $D_2$, which is one before. More particularly, the reference division point $L_3$ immediately before the reference division point $L_4$ previously selected is selected to reselect the temporary division point $D_3$. At this time, of course the confirmation of velocity, acceleration and rate of acceleration change is carried out on the selection of the reference division point $L_4$ as the temporary division point $D_2$.

Next, the reference division point $L_6$ jumped three from the reference division point $L_3$ is selected as a temporary division point $D_3$ and the acceleration is calculated. If the acceleration calculated when the selection program proceeds from $D_1$ to $D_2$ exceeds the threshold, the number of division points to be taken out is reduced to determine the division point $D_3$ such that the acceleration does not exceed the threshold, as in the division point $D_2$. In such a manner, the temporary X/C axes data are sequentially prepared to determine the temporary X/C axes data for the entire circumference of the workpiece. At this time, the determined temporary X/C axes data are taken as modified X/C axes data. In accordance with the modified X/C axes data, the rotation of the main spindle 4 and the reciprocation of the grinding head 2 are controlled to grind the non-circular workpiece 12.

Of course, all the aforementioned components may be incorporated into a numerical control system or another computing system may be used.

As will be apparent from the foregoing, the present invention has the following advantages.

Since the grinding velocity along the circumference of the non-circular workpiece approximates to a constant value and the velocity, acceleration and rate of acceleration change in each of the main spindle and grinding head are controlled so as not to exceed the respective thresholds, the grinding resistance can be maintained substantially constant. Thus, the non-circular workpiece can rapidly be ground without leaving any non-worked parts and with less error. Since the velocity, acceleration and rate of acceleration change are controlled so as not to exceed the respective thresholds, less division points may be selected to reduce the load on the controlling and processing system. Furthermore, since the force on the grinding wheel during operation is not greatly variable, the useful life of the grinding wheel can be elongated with improved precision.

We claim:

1. A method of machining a workpiece into a non-circular configuration by rotating the workpiece fixedly mounted on a main spindle about the main spindle and causing a tool to engage the rotating workpiece in a direction perpendicular to the axis of the main spindle while controlling the forward and backward movement of the tool, said method comprising the steps of:
   a) storing the shape of the workpiece as a group of points represented by polar coordinates about the axial center of the main spindle as an origin;
   b) storing the size of the tool;
   c) converting said group of points representing the shape of the workpiece into profile data representing the profile of the workpiece;
   d) preparing division point data dividing the profile data of the workpiece shape into line segments of minute and equal length;
   e) preparing reference X/C axes data representing the relationship between the position of the tool head and the rotational angle of the main spindle when the tool engages the workpiece at each of said division points;
   f) preparing temporary X/C axes data by selecting the division points in said reference X/C axes data at a given rate;
   g) calculating at least one of the velocity, acceleration and rate of acceleration change in each of the tool head and main spindle when the workpiece is machined in accordance with said temporary X/C axes data and judging whether or not the calculated value exceeds a threshold;
   h) changing said rate of selecting if the calculated value exceeds the threshold;
   i) determining said temporary X/C axes data as modified X/C axes data when the calculated value does not exceed the threshold; and
   j) controlling the tool head and main spindle in accordance with said modified X/C axes data.

2. An apparatus for machining a workpiece into a non-circular configuration by rotating the workpiece fixedly mounted on a main spindle about the main spindle and causing a tool to engage the rotating workpiece in a direction perpendicular to the axis of the main spindle while controlling the forward and backward movement of the tool, said apparatus comprising:
   a) means for storing the shape of the workpiece as a group of points represented by polar coordinates about the axial center of the main spindle as an origin;
   b) means for storing the size of the tool;
   c) means for converting said group of points representing the shape of the workpiece into profile data representing the profile of the workpiece;
   d) means for preparing division point data dividing the profile data of the workpiece shape into line segments of minute and equal length;
   e) means for preparing reference X/C axes data representing the relationship between the position of the tool head and the rotational angle of the main spindle when the tool engages the workpiece at each of said division points;
   f) means for preparing temporary X/C axes data by selecting the division points in said reference X/C axes data at a given rate;
   g) means for calculating at least one of the velocity, acceleration and rate of acceleration change in each of the tool head and main spindle when the workpiece is machined in accordance with said temporary X/C axes data and for judging whether or not the calculated value exceeds a threshold;
   h) means for changing said rate of selecting if the calculated value exceeds the threshold;
   i) means for determining said temporary X/C axes data as modified X/C axes data when the calculated value does not exceed the threshold; and
   j) means for controlling the tool head and main spindle in accordance with said modified X/C axes data.

* * * * *